(12) United States Patent
Huang et al.

(10) Patent No.: US 7,240,486 B2
(45) Date of Patent: Jul. 10, 2007

(54) ELECTRO-HYDRAULIC SYSTEM FOR FAN DRIVING AND BRAKE CHARGING

(75) Inventors: Xiaodong Huang, Peoria, IL (US); Rabie E. Khalil, Dunlap, IL (US); John James Krone, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 106 days.

(21) Appl. No.: 11/107,953

(22) Filed: Apr. 18, 2005

(65) Prior Publication Data

US 2006/0230751 A1    Oct. 19, 2006

(51) Int. Cl.
*F16D 31/02*    (2006.01)
(52) U.S. Cl. .............................. 60/413; 60/456; 91/516
(58) Field of Classification Search ................. 60/413, 60/418, 420, 422, 426, 456, 459; 91/516
See application file for complete search history.

(56) References Cited

U.S. PATENT DOCUMENTS

| | | | |
|---|---|---|---|
| 3,902,566 A * | 9/1975 | Bird | 60/468 |
| 3,942,486 A | 3/1976 | Kirchner | |
| 4,066,047 A | 1/1978 | Vidakovic et al. | |
| 4,179,888 A | 12/1979 | Goscenski, Jr. | |
| 4,189,919 A | 2/1980 | Goscenski, Jr. | |
| 4,223,646 A | 9/1980 | Kinder | |
| 4,446,697 A | 5/1984 | Goscenski, Jr. | |
| 4,798,050 A | 1/1989 | Nakamura et al. | |
| 5,165,377 A | 11/1992 | Hosseini | |
| 5,540,203 A | 7/1996 | Foulkes et al. | |
| 6,151,894 A * | 11/2000 | Endo et al. | 60/414 |
| 6,179,570 B1 | 1/2001 | Smith | |
| 6,314,729 B1 | 11/2001 | Crull et al. | |
| 6,681,568 B2 | 1/2004 | Smith | |
| 6,750,623 B1 | 6/2004 | McCauley et al. | |
| 6,848,255 B2 | 2/2005 | Chiaramonte | |
| 2002/0148223 A1 | 10/2002 | Reiners et al. | |

OTHER PUBLICATIONS

Volvo, Service Manual L220E, Section 5 Brakes (1st ed. publication date unknown) (54 pages).
Volvo, Service Manual L220E, Section 6 Steering (1st ed. publication date unknown) (42 pages).
Volvo, Service Manual L220E, Section 9 Hydraulic system, 9:1 Hydraulic system (1st ed. publication date unknown) (64 pages).

(Continued)

*Primary Examiner*—Igor Kershteyn
(74) *Attorney, Agent, or Firm*—Finnegan, Henderson, Farabow, Garrett & Dunner (57) ABSTRACT

An electro-hydraulic system for a machine may include a brake charging system including at least one accumulator. A fan drive system may include a fan and a fan motor. A fluid source may be in communication with the brake charging system and the fan drive system. The fluid source may be configured to provide pressurized fluid to the brake charging system and the fan drive system to charge at least one accumulator and to drive a fan motor. A priority valve may be configured to provide pressure from the fluid source to the brake charging system, such that the fluid pressure at the accumulator is maintained at a substantially constant level during normal operating conditions.

25 Claims, 3 Drawing Sheets

OTHER PUBLICATIONS

Volvo, Service Manual L220E, Section 9 Hydraulic system, 9:2 Hydraulic diagrams (1st ed. publication date unknown) (21 pages).
Komatsu, WA500-3 Wheel Loader Shop Manual, Serial Numbers WA500-3LE—A70001 and up, pp. 00-1 to 00-2 with Work Equipment Hydraulic Circuit Diagram (Machine with Optional Specification) (Jan. 1999) (5 pages).
Komatsu, WA500-3 Wheel Loader Shop Manual (CEBM001202), Serial Numbers WA500-3LE—A70001 and up (Jan. 1999) (110 pages).

* cited by examiner

ELECTRO-HYDRAULIC SYSTEM FOR FAN DRIVING AND BRAKE CHARGING

TECHNICAL FIELD

This disclosure is directed generally to an electro-hydraulic system and, more particularly, to an electro-hydraulic system for driving a fan and charging a brake system on a work machine.

BACKGROUND

Earthmoving and construction work machines often employ hydraulic systems that provide functionality and control to various aspects of the machines. For example, some work machines employ hydraulic braking systems to control driving speeds and fan hydraulic drive systems that-control machine cooling.

Because each system may have separate flow requirements, the hydraulic systems on some work machines are isolated systems, each having a separate fluid pump. However, providing a separate pump for each separate hydraulic system may be redundant and may be cost prohibitive. Further, such a system may require additional maintenance and upkeep. To overcome these disadvantages, some work machines combine or integrate certain hydraulic systems.

Even in a combined system, one hydraulic system may require different fluid flow parameters than the other and, in addition, may require the different fluid flow at different times. To address this, some known systems direct fluid from a common pump to one system or the other system using a cut-in/cut-out device. For example, on a conventional work machine having a combined braking system and a combined cooling system, fluid may be directed to the brake system to charge or fill accumulators with fluid. Then, the cut-in/cut-out device may cut-out fluid flow to the braking system and may instead direct fluid to the cooling system. Through normal braking, the fluid in the accumulators may be gradually expended until the volume or pressure falls below a lower threshold. When this occurs, the cut-in/cut-out device may cut-in fluid flow to the braking system to again charge the accumulators, while cutting-out fluid flow to the cooling system. Because of this, the fluid level in the accumulators of the brake system fluctuates between a relatively high level and a relatively lower level. However, even at the lower level, the accumulators on conventional work machines must provide a sufficient volume of fluid to stop the work machine in the event of a pump failure.

Another known system that combines a brake and a cooling system is disclosed in U.S. Pat. No. 6,681,568 to Smith. The '568 patent discloses a system having a relief valve in a fluid line directed to a cooling circuit. Control of the relief valve affects fluid flow to both a braking circuit and the cooling circuit. While providing effective cooling and braking, the system disclosed in the '568 patent may be improved upon. For example, the accumulators in the '568 patent may be sized to allow fluctuation between a high fluid level and a relatively lower fluid level, with the accumulators being sized to provide sufficient fluid to the brakes even when the fluid level in the accumulators is at the lower level. Such accumulators may be larger than necessary. Therefore, the system in the '568 patent may be improved upon to provide smaller accumulators that may result in space and cost savings.

The electro-hydraulic system disclosed and described herein may overcome one or more of the problems in the prior art.

SUMMARY OF THE INVENTION

In one exemplary aspect, this disclosure is directed to an electro-hydraulic system for a machine. The electro-hydraulic system may include a brake charging system including at least one accumulator configured to store fluid pressure for brake control. A fan drive system may include a fan and a fan motor, with the fan motor being configured to turn the fan. A fluid source may be in communication with the brake charging system and the fan drive system. The fluid source may be configured to provide pressurized fluid to the brake charging system and the fan drive system to charge the at least one accumulator and to drive the fan motor. A priority valve may be configured in a manner to provide pressure from the fluid source to the brake charging system, such that the fluid pressure at the accumulator is maintained at a substantially constant level during normal operating conditions.

In another exemplary aspect, this disclosure is directed to another electro-hydraulic system for a machine. The electro-hydraulic system may include a brake charging system including at least one accumulator configured to store fluid pressure for brake control. A fan drive system may include a fan and a fan motor, with the fan motor being configured to turn the fan. A fluid source may be in communication with the brake charging system and the fan drive system. The fluid source may be configured to provide pressurized fluid to the brake charging system and the fan drive system to charge the brake system and to drive the fan motor. A priority valve may be disposed between the fluid source and both the brake charging system and the fan drive system. The priority valve may be configured in a manner to permit flow sharing between the brake charging system and the fan drive system.

In yet another exemplary aspect, this disclosure is directed to a method of operating an electro-hydraulic system for a machine. The method may include directing fluid to a brake charging system including at least one accumulator configured to store fluid pressure for brake control. Fluid may be directed to a fan drive system including a fan and a fan motor, with the fan motor being configured to turn the fan. Pressurized fluid may be provided to the brake charging system and the fan drive system with a fluid source to charge the at least one accumulator and to drive the fan motor. The method may also include maintaining fluid pressure at the accumulator at a substantially constant level during normal operating conditions.

DETAILED DESCRIPTION

Reference will now be made in detail to exemplary embodiments that are illustrated in the accompanying drawings. Wherever possible, the same reference numbers will be used throughout the drawings to refer to the same or like parts. While specific configurations and arrangements are discussed, it should be understood that this is done for illustrative purposes only.

Figure 1:
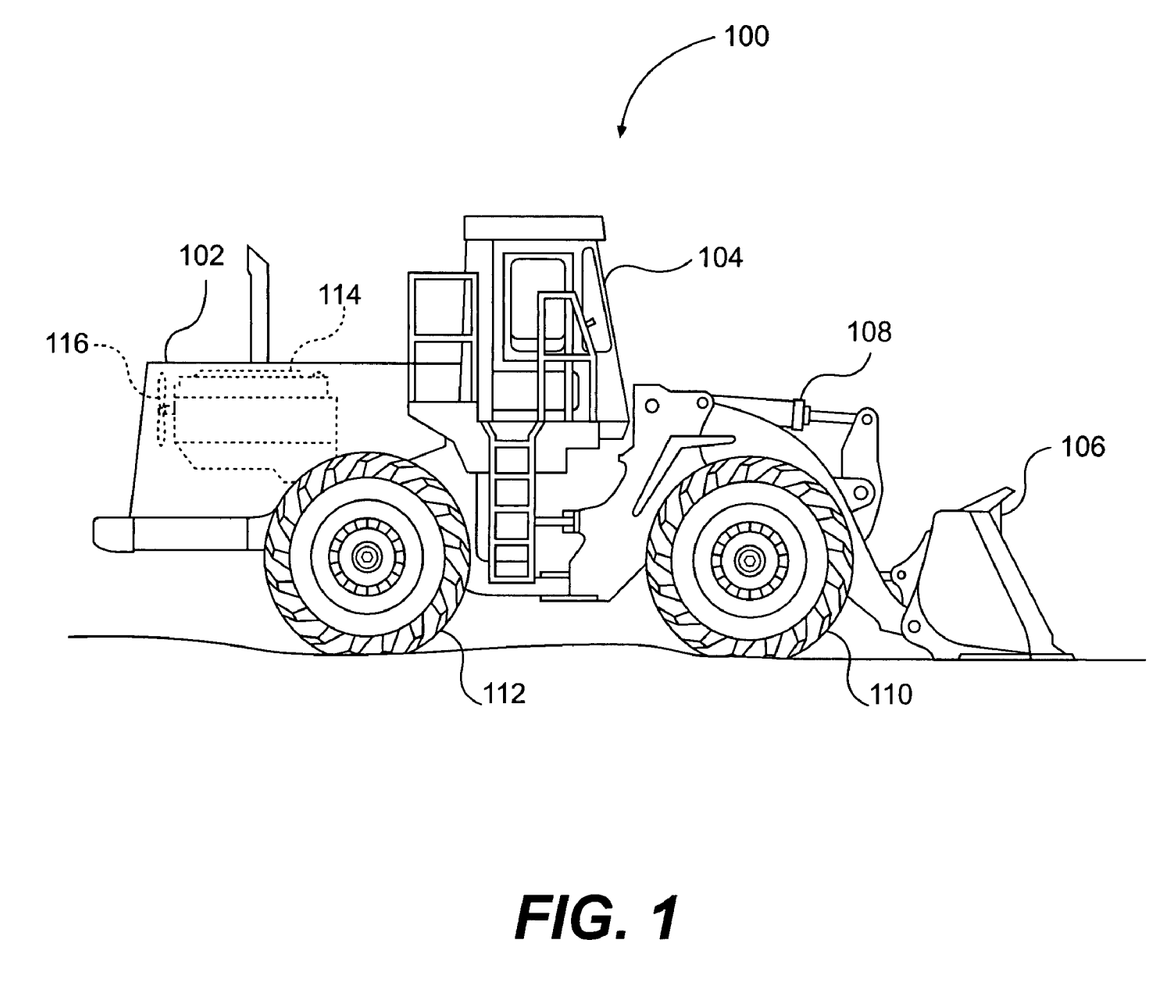
FIG. 1 is a diagrammatic illustration of an exemplary work machine.

FIG. 1 shows an exemplary work machine 100 that may incorporate an electro-hydraulic system as disclosed herein. The work machine 100 may include an engine housing 102, an operator station 104, and a work implement 106, such as, for example, a bucket for digging and loading material.

In the example of work machine 100 being a wheel loader, the work implement 106 is powered and controlled by a number of actuators, including a tilt actuator 108. The work machine 100 may include front and rear ground engaging devices, such as front wheels 110 and rear wheels 112 that support the work machine 100.

The engine housing 102 may include a power source 114, such as an engine, and a hydraulically-driven cooling fan 116. The power source 114 may provide power to the front and/or rear wheels 110, 112. The cooling fan 116 may form part of a cooling system configured to draw or push air through a heat exchanger and/or provide convective cooling to the power source 114.

In addition, the work machine 100 may include a braking system (not shown in FIG. 1) operable to resist movement of the work machine 100. The braking system may be associated with the wheels 110, 112 and may be operable from input devices within the operator station 104. The brake system and the cooling system incorporating the fan 116 may be integrated hydraulically-driven systems that operate from a common fluid source.

Figure 2:
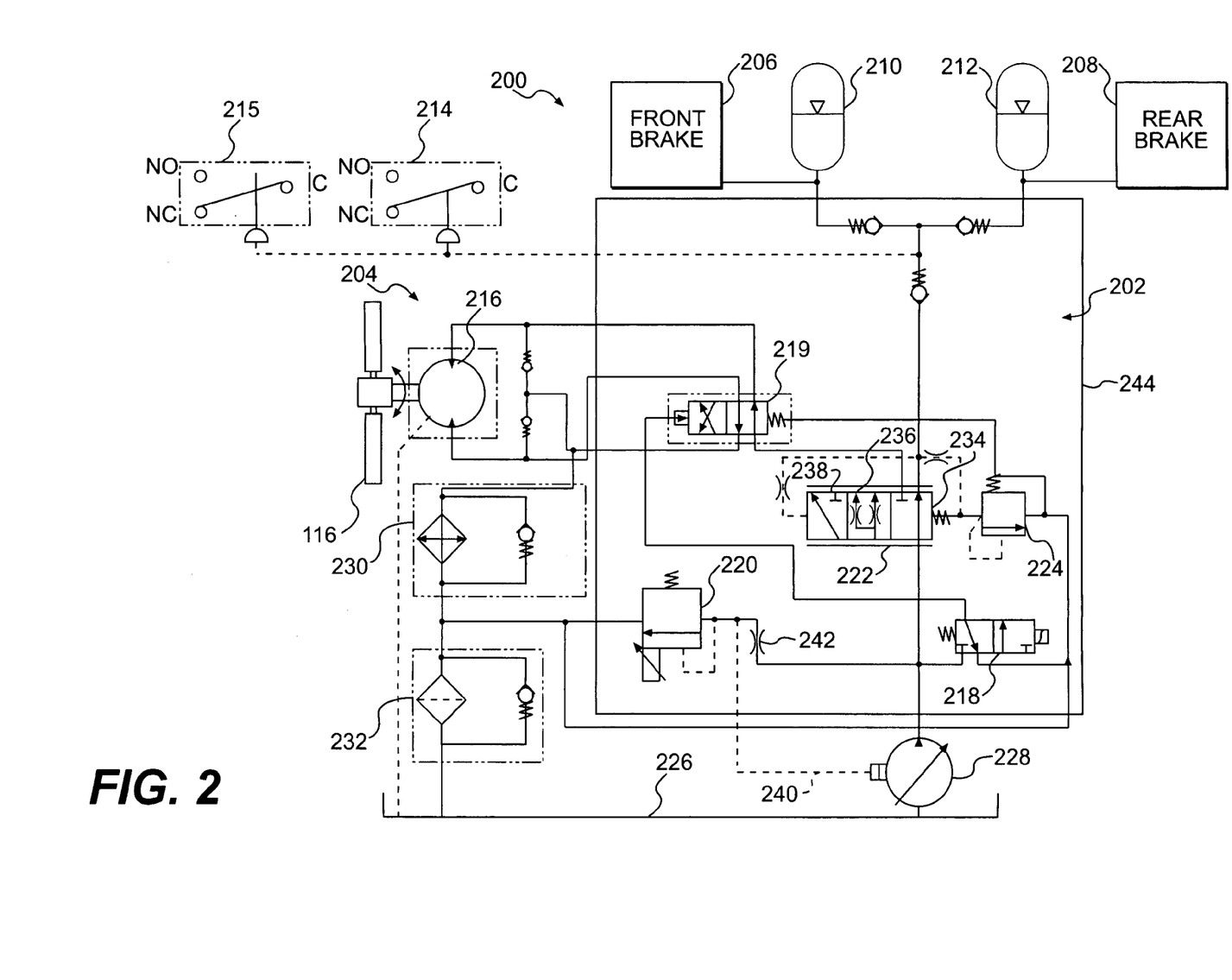
FIG. 2 is a schematic representation of an exemplary electro-hydraulic system.

One example of an integral fan and brake electro-hydraulic system 200 that may be incorporated on the work machine 100 is disclosed in and described with reference to FIGS. 2 and 3. The electro-hydraulic system 200 may include a plurality of fluid components and electrical components that cooperate together to control the braking and cooling capacity of the work machine 100.

The electro-hydraulic system 200 includes a brake charging system 202 and a fan drive system 204. The brake charging system 202 may include front and rear brakes 206, 208, a front and a rear accumulator 210, 212, a brake low pressure switch 214, a dual-demand switch 215, and a number of check valves. The fan drive system 204 may include the fan 116, a fan motor 216, a reversing valve 218, a fan drive directional valve 219, and a fan speed control valve 220. In addition to the components mentioned above, the brake charging and fan drive systems 202, 204 include a number of integral or common components. In the exemplary embodiment in FIG. 2, the integral components include a priority valve 222, a pressure relief valve 224, a tank 226, and a common fluid source 228. In addition, the electro-hydraulic system 200 may include a cooler 230 and a filter 232 as known in the art. Controller components of the electro-hydraulic system 200 may include a control module 306, a temperature sensor 302, and a fan speed sensor 304, as shown in FIG. 3.

The front and rear brakes 206, 208 may be respectively and operably associated with the front and rear wheels 110, 112 of the work machine 100 in a manner to selectively resist the motion of work machine 100. In one exemplary embodiment, the front and rear brakes 206, 208 may include a braking device and a brake valve (not shown). The braking device may be a hydraulic pressure-actuated wheel brake such as, for example, a disk brake or a drum brake that is disposed intermediate the wheels 110, 112 and a drive assembly (not shown) of the work machine 100. The brakes 206, 208 may be operated in a known manner, such as by a brake pedal disposed within the operator cab 104 of the work machine 100. The brakes 206, 208 also may be integrated with axles or other drive train components of the work machine 100 rather than being associated with the wheels 110, 112.

The front and rear accumulators 210, 212 may be fluidly associated with the respective front and rear brakes 206, 208 through a brake pedal valve (not shown). The accumulators 210, 212 may be configured to hold a supply of pressurized fluid at a desired pressure and to provide the desired fluid to slow or stop movement of the work machine 100. For example, the fluid level in the accumulators 210, 212 may be maintained above a pre-established threshold in order to provide brake pressure when desired by a work machine operator.

The brake low pressure switch 214 may be configured to detect when fluid pressure being fed to the accumulators 210,.212 drops below a preset limit. When the fluid pressure fed to the accumulators 210, 212 drops below the limit, the brake low pressure switch 214 may be configured to illuminate a lamp or warning light (not shown) disposed within the operator station 104 of the work machine 100, thereby alerting an operator of the low fluid pressure. In the exemplary embodiment shown in FIG. 2, the brake low pressure switch 214 is configured to sense a fluid pressure between the accumulators 210, 212 and the priority valve 222. In another exemplary embodiment, the brake low pressure switch 214 may be associated with one or both of the brakes 206, 208 or one or both of the accumulators 210, 212 to measure an accumulator fluid pressure. The brake low pressure switch 214 also may be disposed at other locations. Although the exemplary electro-hydraulic system 200 employs a load sensing line to monitor the fluid pressure, in alternative embodiments, the brake low pressure switch 214 may be activated using pressure sensors that generate an electrical or mechanical signal that may be communicated to a controller that may activate the lamp, warning light, or other warning signal.

The dual-demand switch 215, like the brake low pressure switch 214, also may be configured to detect when fluid pressure being fed to the accumulators 210, 212 drops below a preset limit. The preset limit associated with the dual-demand switch 215 may be different than the preset limit associated with the brake low pressure switch 214. When the fluid pressure fed to the accumulators 210, 212 drops below the limit, the dual-demand switch 215 may indicate to the control module 306 (shown in and described with reference to FIG. 3), that the electro-hydraulic system 200 should be controlled to provide additional fluid, thereby increasing the pressure in the electro-hydraulic system 200 and in the brake charging system 202. Like the brake low pressure switch 214, the dual-demand switch 215 may be activated using any number or type of pressure sensors that may communicate a signal indicative of the monitored pressure.

The fan motor 216 of the fan drive system 204 may be associated with and configured to power the fan 116. Powered by fluid pressurized by the fluid source 228, the fan motor 216 may be configured to rotate the fan 116 to draw or push air across the power source 114 or across a heat exchanger (not shown). The flow rate of pressurized fluid through the fan motor 216 may correspond to and drive the rotational speed of the cooling fan 116. In one exemplary embodiment, make-up valves are associated with the fan motor and configured to reduce cavitation in the motor.

The reversing valve 218 may be a solenoid driven valve that directs pilot fluid to a fan drive directional valve 219. The fan drive directional valve 219 may be a two-position, four-way, pilot-operated, directional valve moveable between a first position, at which the pressurized fluid is directed to the fan motor 216 in a first direction that may drive the fan 116 in the air-pushing direction, and a second position at which the pressurized fluid is directed to the fan motor 216 in a second direction that may drive the fan 116 in the air-drawing direction.

The fan speed control valve 220 may be a proportional, solenoid-actuated pressure relief valve configured to regulate fluid pressure in a load sensing line 240 associated with the fluid source 228. A restrictive orifice 242 may be located between the fluid source 228 and the fan speed control valve 220 and may provide a differential pressure between the fluid from the fluid source 228 and the fluid in the load sensing line 240. As regulated by the fan speed control valve 220, fluid pressure at the load sensing line 240 may be used to control fluid flow from the fluid source 228. For example, the fan speed control valve 220 may be configured to be actuated in a manner to provide fluid pressure that controls the position of a swash plate of the fluid source 228. The fan speed control valve 220 may be configured so that when power to the solenoid is off, the valve 220 may provide high pressure in the load sensing line 240. Accordingly, the pump swash plate angle may be positioned at a maximum angle. The maximum angle may correspond to the maximum displacement and may lead to a maximum rate of fluid flow from the pump to satisfy a fluid demand from either brake charging system 202 or the fan drive system 204.

The priority valve 222 may be configured to provide fluid to both the brake charging system 202 and the fan drive system 204. In order to ensure that pressure is continuously available to the brake charging system 202, the priority valve 222 is configured to give priority of fluid flow to the brake charging system 202 over the fan drive system 204. In other words, the priority valve 222 may be configured to direct fluid to the brake charging system 202 anytime there is a fluid demand on the brake charging system 203, regardless of demand at the fan drive system 204. In the exemplary embodiment shown in FIG. 2, the priority valve 222 may be a three-position, pressure driven valve having a start-up position 234, a shared-flow position 236, and a fan-only position 238. The priority valve 222 may be configured in a manner to share the flow of fluid to the brake charging system 202 and the fan drive system 204. This flow-sharing occurs because during normal operating conditions, the priority valve 222 is positioned so that fluid is directed through either the shared-flow position 236 or the fan-only position 238. The shared-flow position 236 may include passages with orifices that provide a desired flow ratio to both the brake charging and fan drive systems 202, 204, with the brake charging system 202 having a higher priority. The orifices may be the same size or different sizes. The priority valve 222 may be positioned at the fan-only position 238 when there is no demand for fluid at the brake charging system 202.

Because of flow-sharing, the priority valve 222 may be configured to continuously direct fluid to the fan drive system 204 during normal operating conditions. As used herein, the term "normal operating conditions" is intended to refer to the work machine condition during substantially normal use, including during braking. Normal operating conditions do not include start-up, times of system failure, and other system anomalies.

When there is no demand for braking fluid at the brake charging system 202, the priority valve 222 may be configured to be positioned at the fan-only position 238. Anytime there is a demand for fluid at the brake charging system 202, the priority valve 222 may be responsive to the demand and may be configured to shift to the shared-flow position 236 so that fluid is directed to both the brake charging and fan drive systems 202, 204. The demand may be detected by a reduction in the brake charging system fluid pressure. Accordingly, the priority valve 222 does not cut-in or cut-out of the fan drive system 204 when there is a need for additional fluid at the brake charging system 204. Instead, the priority valve 222 provides shared flow to the brake charging system 202 and the fan drive system 204 whenever the brake charging system 202 requires fluid flow during normal operating conditions.

Because the brake charging system 202 has a higher priority, the priority valve 222 is configured to provide fluid flow to the brake charging system 202 whenever fluid is consumed by the brakes 206, 208. Therefore, the priority valve 222 may be responsive to a pressure reduction at the brake charging system 202 and may be configured to provide fluid to maintain a fluid level in the accumulators 210, 212 at a substantially constant level, such as, for example, a fully-charged level. In one exemplary embodiment, a substantially constant fluid level may be defined to include a change in fluid level of less than 25% of the volume of the accumulators 210, 212, while in another exemplary embodiment, a substantially constant fluid level may be defined to include a change in fluid level of less than 15% of the volume of the accumulators 210, 212. In yet another exemplary embodiment, a substantially constant fluid level may be defined to include a change in fluid level of less than 10%, and in another, a change in fluid level of less than 5%. Because of the flow-sharing, even while maintaining the accumulator fluid level at a substantially constant level, fluid may be continuously provided to the fan drive system 204 during normal operating conditions.

The pressure relief valve 224 may be associated with the priority valve 222 and may be configured to selectively limit the maximum pressure of the fluid through the priority valve 222 to the brake charging system 202. To do this, the pressure relief valve 224 may be operable to reduce the pilot pressure on the right side (in the exemplary embodiment shown) of the priority valve 222, allowing the priority valve 222 to shift between the shared-flow position 236 and the fan-only position 238. The pressure relief valve 224 may have a valve element that is spring biased toward a valve closing position and movable toward a valve opening position in response to a pressure within an associated fluid passageway being above a predetermined pressure. It is contemplated that the predetermined pressure may be varied electronically, manually, or in any other appropriate manner to produce variable pressure relief settings.

The tank 226 may constitute a reservoir configured to hold a supply of fluid, such as, for example, a dedicated hydraulic oil, an engine lubrication oil, a transmission lubrication oil, or any other fluid known in the art.

The electro-hydraulic system 200 may draw fluid from and return fluid to the tank 226. It is also contemplated that the electro-hydraulic system 200 may be connected to multiple separate fluid tanks.

The fluid source 228 may be configured to draw fluid from the tank 226 and produce a flow of pressurized fluid through the priority valve 222 to the brake charging and fan drive systems 202, 204. The fluid source 228 may comprise, for example, a variable displacement pump, a variable delivery pump, or any other pressurizing system known in the art. The fluid source 228 may be drivably connected to the power source 114 in FIG. 1, by for example, a countershaft (not shown), a belt (not shown), an electrical circuit (not shown), or in any other suitable manner. Alternatively, the fluid source 228 may be indirectly connected to the power source 114, such as the engine, via a torque converter, a gear box, or in any other appropriate manner. It is contemplated that multiple sources of pressurized fluid may be interconnected to supply pressurized fluid to electro-hydraulic system 200.

In one exemplary embodiment, the reversing valve 218, the fan drive directional valve 219, the fan speed control valve 220, the priority valve 222, and the pressure relief valve 224 are integrated into a common manifold 244. Such integration may reduce costs and reduce plumbing that may be required when the components are not integrated. It should be noted that in other exemplary embodiments, any combination of two or more components may be integrated in the manifold 244 with the others not being integrated in the manifold 244.

Figure 3:
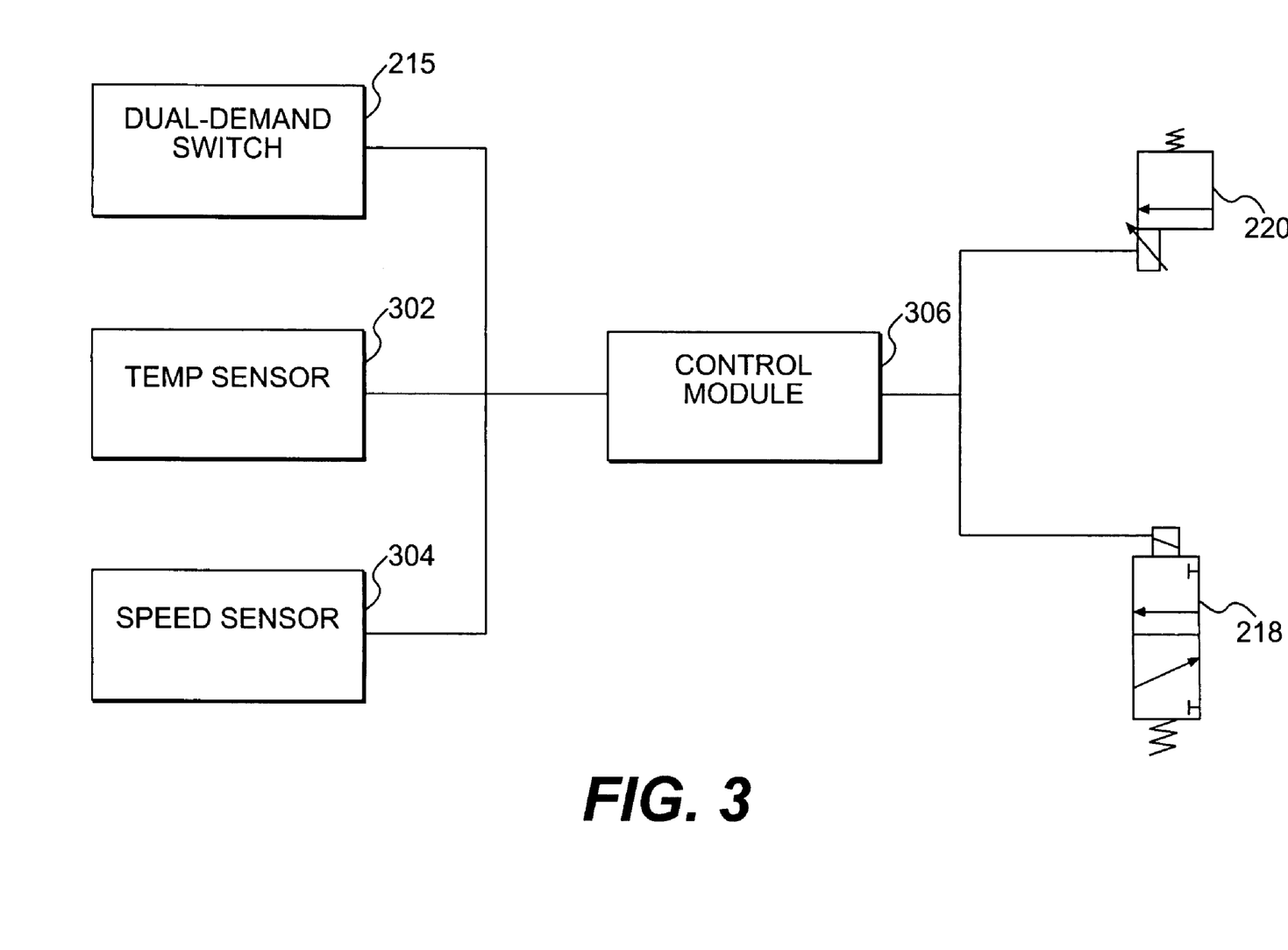
FIG. 3 is a schematic representation of an exemplary electrical control system of the electro-hydraulic system in FIG. 2.

FIG. 3 shows the controller components of the electro-hydraulic system 200. The controller components include a temperature sensor 302, a speed sensor 304, and a control module 306. The temperature sensor 302 may include one or more temperature or other sensors configured to monitor a temperature of the power source 114 (shown in FIG. 1), the heat exchanger (not shown), or any other component of the work machine 100. The fan speed sensor 304 may be associated with the fan motor 216 or the fan 116 and may be configured to detect information indicative of a fan speed.

The control module 306 may include a processor and memory.

The memory may store one or more routines executable by the processor, which could be software programs, for controlling the electro-hydraulic system 200. In addition, the memory may store pre-established values or data used to determine a desired fluid flow from the fluid source 228 to operate the fan 116 at a desired speed and to provide a desired pressure to the brake charging system 202.

The control module 306 may be in communication with the temperature sensor 302 and the fan speed sensor 304. In addition, the control module 306 may be in communication with the dual-demand switch 215, the reversing valve 218, and the fan speed control valve 220. Based upon information communicated from the temperature sensor 302, the fan speed sensor 304, or the dual-demand switch 215, the control module 306 may generate a control signal to control the fan speed control valve 220. By controlling the fan speed control valve 220, the control module 306 may be configured to control the fluid output from the fluid source 228. For example, based upon a signal from the temperature sensor 302, the control module 306 may be configured to output a command signal to the fan speed control valve 220 to increase or decrease fluid flow through the fan speed control valve 220. When fluid flow is decreased, pressure in a load sensing line 240 adjacent the fan speed control valve 220 may increase and, in one example, may cause a displacement of the fluid source 228 to increase, thereby increasing fluid flow from the fluid source 228. The increase in fluid flow increases the speed of the fan motor 216, thereby increasing the speed of the fan 116, and ultimately increasing the cooling. Likewise, a decrease in pressure at the load sensing line 240 may decrease fluid displacement at the fluid source 228 and ultimately decrease the fan speed and cooling.

The control module 306 also may control flow based upon a signal from the dual-demand switch 215. The dual-demand switch 215 may communicate the signal when the pressure in the brake charging system 202 drops below a threshold level. In one exemplary embodiment, the pressure may drop below the threshold level as a result of a reduced cooling demand at the same time there is a brake demand on the electro-hydraulic system 200. Because of the reduced cooling demand, the fluid source 228 may be controlled to provide a reduced fluid flow. Because of the reduced fluid flow, a braking demand may cause the pressure in the brake charging system 202 to drop below the threshold level. If this occurs, based upon the signal from the dual-demand switch 215, the control module 306 may increase the current to the fan speed control valve 220 to increase the pressure in the load sensing line 240 and increase displacement of the fluid source 228, thereby providing additional flow to maintain sufficient pressure in the brake charging system 202.

The control module 306 also may be configured to communicate a fan-reversing signal to the reversing valve 218 in order to change the rotational direction of the fan 116. In one exemplary embodiment, the control module 306 may be configured to generate the fan-reversing signal at timed intervals, such as, for example, for 30 seconds after every twenty minutes of operation. This may be used to blow accumulated debris off the heat exchanger. Other methods of determining when to generate the fan-reversing signal could also be used. In one exemplary embodiment, the control module 306 may be configured to reduce the rotational speed of the fan 116 prior to communication of the fan-reversing signal to the reversing valve 218. For example, during high cooling, the fan 116 may be rotating at, for example, speeds of 1000 to 1250 rpm. The control module 306 may control the fan speed control valve 220 to reduce the pressure in the load sensing line 240, thereby reducing the fluid pressure output from the fluid source 228. When the fan speed is reduced as a result of the decreased fluid pressure, the control module 306 may communicate the fan-reversing signal to the reversing valve 218. Then, the control module 306 may control the fan speed control valve 220 to control the pump to increase the rotational speed of the fan 116 to a desired cooling speed. In one exemplary embodiment, the fan speed may be reduced below 500 rpm before reversing the fan direction. In another exemplary embodiment, the fan speed may be reduced below 300 rpm before reversing the fan direction.

It is contemplated that electro-hydraulic system 200 may include additional and/or different components than those shown such as, for example, accumulators, restrictive orifices, check valves, pressure relief valves, makeup valves, pressure-balancing passageways, and other components known in the art. It is contemplated that other components may also be utilized in the system to customize the system according to specific needs. In one exemplary embodiment, a shuttle valve may be used to maintain fluid flow direction in the brake charging system 202. Other systems and methods may also be implemented on the electro-hydraulic system 200.

In another exemplary embodiment of the electro-hydraulic system 200, the priority valve may be a pressure reducing and relieving valve (not shown) disposed to control fluid flow to the brake charging system 202. In such an embodiment, the pressure reducing and relieving valve may be configured to maintain the accumulators 210, 212 at a substantially constant level, such as a fully-charged level. The pressure reducing and relieving valve optionally may be disposed in a manner that permits flow sharing between the brake charging and the fan drive systems.

In yet another exemplary embodiment, the priority valve may be a combined solenoid actuated and pilot operated valve. In this exemplary embodiment, the priority valve may be disposed along a fluid line between the fan drive system and the fluid source. Accordingly, the priority valve may not be disposed along a fluid line between the brake charging system and the fluid source. Nevertheless, the electro-hydraulic system and the priority valve may be configured to control flow to the fan drive system in a manner that promotes priority of fluid flow to the brake charging system.

INDUSTRIAL APPLICABILITY

The electro-hydraulic system 200 described herein employs a priority valve 222 that directs fluid to the brake charging system 202 to maintain the accumulators 210, 212 at a substantially constant level during normal operation. In one exemplary embodiment, the priority valve 222 is configured to maintain fluid pressure in the accumulators 210, 212 at a substantially maximum level, or a fully-charged level during normal operating conditions. This is contrasted with conventional systems that provide a cut-out/cut-in valve that directs fluid to one system at a time, such as providing fluid to a brake system only after an accumulator fluid level drops below a set threshold. Therefore, instead of fluctuating between a maximum and a minimum level as done on conventional work machines, the fluid level in the accumulators 210, 212 used in the electro-hydraulic system 200 is maintained at a substantially constant level, such as substantially fully-charged or maximum level. Because the system is maintained at a substantially fully-charged or maximum level during normal operating conditions, the accumulators 210, 212 of the brake charging system 202 may be smaller than those of conventional systems. For example, the size of accumulators 210, 212 may have a total volume comparable to the fluid volume of the lower threshold levels of conventional accumulators. The reduced size requirements may provide space savings and potentially cost savings. Naturally, the accumulators 210, 212 could also be other sizes.

In addition, in the example shown, the priority valve 222 is configured to provide flow-sharing between the brake charging and fan-drive systems 202, 204. This flow-sharing occurs because the fan drive system 204 receives fluid pressure or flow at all times during normal operating conditions, even when the priority valve 222 directs fluid to the higher priority brake charging system 202. Accordingly, there is no cut-in or cut-out during normal operating conditions, as is done with conventional systems.

An exemplary description of the operation of the hydraulic system 200 is now provided. When the work machine 100 is powered off, meaning that the fluid source 228 is not operating, the priority valve 222 may be biased to the start-up position 234. When the work machine 100 is then powered on, the fluid source 228 may become active, providing fluid to the priority valve 222. During start-up, the fluid may be directed through the start-up position 234 of the priority valve 222 only to the brake charging system 202. When the accumulators 210, 212 are fully charged, the fluid pressure shifts the priority valve 222 to the fan-only position 238. Typically, during start-up, the accumulators 210, 212 may charge and the priority valve 222 may shift in a matter of a few tenths of a second. However, faster or slower systems may be used.

During normal operation, after start-up, the priority valve 222 may shift between the shared-flow position 236 and the fan-only position 238. Because the accumulators 210, 212 are full immediately after start-up, the priority valve 222 may shift, based on fluid pressure in load sensing lines, to the shared-flow position 236 or the fan-only position 238. So long as there is no drain on the brake charging system 202, the priority valve 222 may be positioned in the fan-only position 238, directing fluid to the fan drive system 204.

When the brakes 206, 208 are used, pressure in the brake charging system 202 decreases, causing a decrease in pressure at the priority valve 222. The priority valve 222 then shifts from the fan-only position 238 to the shared-flow position 236. Accordingly, at a reduction in pressure at the brake charging system 202, the priority valve 222 responsively shifts to minimize any drain from the accumulators 210, 212, thereby maintaining a substantially constant fluid level within the accumulators 210, 212.

Even while providing fluid to the brake charging system 202, the shared-flow position 236 directs fluid to the fan driving system 204. Accordingly, both the brake charging system 202 and the fan driving system 204 are simultaneously provided with fluid flow.

As the temperature sensor 302 detects an increase in temperature of a monitored component, such as the power source 114, the control module 306 may increase the speed of the fan 116 by communicating a command signal to the fan speed control valve 220. The fan speed control valve 220 may be controlled to reduce its fluid flow, thereby increasing the fluid pressure in the load sensing line 240 and providing increased displacement at the fluid source 228. This increases the fluid flow rate from the fluid source 228, which, in turn, provides a higher flow rate through the fan motor 216, thereby increasing the speed of the fan 116 and thus, increasing the cooling. Decreasing the cooling amount may be likewise controlled.

If the cooling demand is minimal, as may occur during exceptionally cold weather, the control module 306 may control the fan speed control valve 220 to minimize displacement and minimize fluid flow from the fluid source 228 in order to minimize the cooling. Thus, the fluid source 228 would provide a minimal flow. If fluid demand at the brake charging system 202 were to exceed the minimal flow from the fluid source 228, the low fluid pressure may actuate the dual-demand switch 215, thereby communicating a signal to the control module 306. In response, the control module 306 may communicate a control signal to the fan speed control valve 220 to affect the displacement of the fluid source 228 to increase the output fluid flow. The fluid may then be directed through the shared-flow position 236 of the priority valve 222 to the brake charging system 202, thereby maintaining the fluid level in the accumulators 210, 212 at a substantially constant level.

At desired intervals, or upon an operator demand, the control module 306 may generate and communicate a fan-reversing signal to the solenoid-actuated reversing valve 218. In one exemplary embodiment, the control module 306 may control the fan speed control valve 220 to reduce pressure output from the fluid source 220 until the fan rotational speed is less than a threshold, such as 300 rpm. Once the fan speed is below the threshold, the reversing valve 218 may direct a pilot fluid to and shift the position of the fan drive directional valve 219. Upon shifting from one position to another, fluid through the fan drive directional valve 219 is directed to the fan motor 216 in a direction that reverses the rotation of fan motor. The reversing valve may be actuated for any amount of time, but in one exemplary embodiment, is actuated for about 30 seconds in order to blow away debris that may have accumulated on the heat exchanger that may be adjacent the fan 116.

Although the electro-hydraulic system 200 is discussed with reference to a work machine, the principles and system described herein are equally applicable to any machine having fluid-driven cooling and braking systems. Further, although the system describes a three position priority valve, the valve could be any valve operable to maintain accumulators at a substantially constant fluid level or operable to induce flow-sharing between systems.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An electro-hydraulic system for a machine comprising:
   a brake charging system including at least one accumulator configured to store fluid pressure for brake control;
   a fan drive system including a fan and a fan motor, the fan motor being configured to turn the fan;
   a fluid source in communication with the brake charging system and the fan drive system, the fluid source being configured to provide pressurized fluid to the brake charging system and the fan drive system to charge the at least one accumulator and to drive the fan motor; and
   a priority valve configured to provide pressure from the fluid source to the brake charging system, such that the fluid pressure at the accumulator is maintained at a substantially constant level during normal operating conditions, wherein the priority valve is a three-position, pressure driven valve.

2. An electro-hydraulic system for a machine comprising:
   a brake charging system including at least one accumulator configured to store fluid pressure for brake control;
   a fan drive system including a fan and a fan motor, the fan motor being configured to turn the fan;
   a fluid source in communication with the brake charging system and the fan drive system, the fluid source being configured to provide pressurized fluid to the brake charging system and the fan drive system to charge the at least one accumulator and to drive the fan motor; and
   a priority valve configured to provide pressure from the fluid source to the brake charging system, such that the fluid pressure at the accumulator is maintained at a substantially constant level during normal operating conditions, wherein the priority valve includes a fan-only position and a shared-flow position, the priority valve being configured to shift between the fan-only position and the shared-flow position.

3. The electro-hydraulic system of claim 2, wherein the substantially constant level.

4. The electro-hydraulic system of claim 2, wherein the priority valve is responsive to a reduction in the brake charging system and configured to direct fluid to the brake charging system in response to the pressure reduction.

5. The electro-hydraulic system of claim 2, wherein the priority valve is configured to provide flow sharing between the brake charging system and the fan drive system.

6. The system of claim 2, further including:
   a control module; and
   a fan speed control valve configured to affect the output of the fluid source, the control module being configured to control the fan speed control valve.

7. The system of claim 2, wherein the priority valve is configured such that the fluid pressure at the accumulator is maintained at a substantially constant level having a variation of less than 25% of the volume of the accumulator during normal operating conditions.

8. The system of claim 2, wherein the priority valve is configured such that the fluid pressure at the accumulator is maintained at a substantially constant level having variation of less than 10% of the volume of the accumulator during normal operating conditions.

9. An electro-hydraulic system for a machine comprising:
   a brake charging system including at least one accumulator configured to store fluid pressure for brake control;
   a fan drive system including a fan and a fan motor, the fan motor being configured to turn the fan;
   a fluid source in communication with the brake charging system and the fan drive system, the fluid source being configured to provide pressurized fluid to the brake charging system and the fan drive system to charge the at least one accumulator and to drive the fan motor; and
   a priority valve configured to provide pressure from the fluid source to the brake charging system, such that the fluid pressure at the accumulator is maintained at a substantially constant level during normal operating conditions, wherein the fan drive system includes a reversing valve operable to reverse the flow of fluid through the fan motor to change a rotational direction of the fan.

10. The electro-hydraulic system of claim 9, further including a control module in communication with the reversing valve, wherein the reversing valve is a solenoid operated valve and the control module is configured to control the reversing valve.

11. An electro-hydraulic system for a machine comprising:
    a brake charging system including at least one accumulator configured to store fluid pressure for brake control;
    a fan drive system including a fan and a fan motor, the fan motor being configured to turn the fan;
    a fluid source in communication with the brake charging system and the fan drive system, the fluid source being configured to provide pressurized fluid to the brake charging system and the fan drive system to charge the brake system and to drive the fan motor; and
    a priority valve disposed between the fluid source and the brake charging system and also disposed between the fluid source and the fan drive system, the priority valve being configured to permit flow sharing between the brake charging system and the fan drive system.

12. The electro-hydraulic system of claim 11, wherein the priority valve includes a first and a second position, the first position being operable to direct fluid only to the fan drive system and the second position being operable to permit the flow sharing.

13. The electro-hydraulic system of claim 11, wherein the priority valve directs fluid to the brake charging system to maintain the at least one accumulator at a substantially fully-charged level during normal operating conditions.

14. The electro-hydraulic system of 11, wherein the fan drive system includes a reversing valve operable to reverse the flow of fluid through the fan motor to change a rotation direction of the fan.

15. The electro-hydraulic system of claim 14, further including a control module in communication with reversing valve, wherein the reversing valve is a solenoid operated valve and the control module is configured to control the reversing valve.

16. The electro-hydraulic system of claim 11, further including:
- a control module; and
- a fan speed control valve configured to affect the output of the fluid source, the control module being configured to control the fan speed control valve.

17. The electro-hydraulic system of claim 16, wherein the priority valve and the fan speed control valve are within a common manifold.

18. A method of operating an electro-hydraulic system for a machine, comprising:
- directing fluid to a brake charging system including at least one accumulator configured to store fluid pressure for brake control;
- directing fluid to a fan drive system including a fan motor the fan motor being configured to turn the fan;
- providing pressurized fluid to the brake charging system and the fan drive system with a fluid source to charge the least one accumulator and to the fan motor;
- maintaining the fluid pressure at the accumulator at a substantially constant level during normal operating conditions; and
- providing flow sharing between the brake charging system and the fan drive system.

19. The method of claim 18, including directing fluid pressure to the brake charging system in response to a reduction in pressure in the brake charging system.

20. The method of claim 18, including:
- positioning a priority valve at a fan-only position when there is no fluid demand on the brake charging system; and
- shifting the priority valve to a shared-flow position when there is fluid demand on the brake charging system.

21. The method of claim 18, including reversing a rotational direction of the fan motor to change a rotational direction of the fan.

22. A method of operating an electro-hydraulic system for a machine, comprising:
- directing fluid to a fan drive system including a fan and a fan motor, the fan motor being configured to turn the fan;
- providing pressurized fluid to the fan drive system with a fluid source to drive the fan motor;
- reducing a rotational speed of the fan below a pre-established threshold; and
- activating a reversing valve configured to reverse the rotational direction of the fan.

23. The method of claim 22, wherein the pre-established threshold is 500 rpm.

24. The method of claim 22, wherein the pre-established threshold is 300 rpm.

25. The method of claim 22, including directing fluid to a brake charging system including at least one accumulator configured to store fluid pressure for brake control.

* * * * *

UNITED STATES PATENT AND TRADEMARK OFFICE
CERTIFICATE OF CORRECTION

PATENT NO. : 7,240,486 B2 Page 1 of 1
APPLICATION NO. : 11/107953
DATED : July 10, 2007
INVENTOR(S) : Huang et al.

It is certified that error appears in the above-identified patent and that said Letters Patent is hereby corrected as shown below:

In the claims:

In Column 11, Line 50, in Claim 3, after "constant" and before "level" insert --is a fully-charged--.

In Column 11, Line 52, in Claim 4, after "reduction" insert --in pressure--.

In Column 12, Line 3, in Claim 8, after "having" insert --a--.

In Column 13, Line 16, in Claim 18, after "including" insert --a fan and--.

Signed and Sealed this

Twenty-ninth Day of April, 2008

JON W. DUDAS
*Director of the United States Patent and Trademark Office*